United States Patent [19]

McDougall et al.

[11] Patent Number: 5,102,559

[45] Date of Patent: * Apr. 7, 1992

[54] ENCAPSULATED BREAKER CHEMICAL WITH A MULTI-COAT LAYER UREA

[75] Inventors: Lee A. McDougall, Houston; John C. Newlove, Kingwood, both of Tex.; Pacifico V. Manalastas, Edison; Evelyn N. Drake, Bernardsville, both of N.J.

[73] Assignee: Exxon Research and Engineering Company, Florham Park, N.J.

[*] Notice: The portion of the term of this patent subsequent to Apr. 7, 2009 has been disclaimed.

[21] Appl. No.: 637,391

[22] Filed: Jan. 4, 1991

Related U.S. Application Data

[63] Continuation-in-part of Ser. No. 446,572, Dec. 4, 1989, abandoned, and a continuation-in-part of Ser. No. 446,573, Dec. 4, 1989, abandoned, and a continuation-in-part of Ser. No. 446,736, Dec. 6, 1989, abandoned.

[51] Int. Cl.$^5$ ............................................. E21B 43/26
[52] U.S. Cl. ......................... 252/8.551; 252/8.553; 252/186.32; 252/330; 252/358; 428/402.22; 166/308; 427/213
[58] Field of Search ............ 252/8.551, 8.553, 186.32, 252/330, 358; 166/308; 427/213; 428/402.22

[56] References Cited

U.S. PATENT DOCUMENTS

| | | | |
|---|---|---|---|
| 3,990,978 | 11/1976 | Hill | 252/8.551 |
| 4,701,204 | 10/1987 | Duvdevani et al. | 71/28 |
| 4,741,401 | 5/1988 | Walles et al. | 166/300 |
| 4,741,956 | 5/1988 | Thaler et al. | 428/334 |
| 4,770,796 | 9/1988 | Jacobs | 252/8.553 |
| 4,788,081 | 11/1988 | Thaler et al. | 427/212 |
| 4,919,209 | 4/1990 | King | 166/300 |

Primary Examiner—Robert L. Stoll
Assistant Examiner—Chhaya Sayala
Attorney, Agent, or Firm—Jay Simon

[57] ABSTRACT

An encapsulated breaker chemical composition used in a fracturing process in an oil or gas stimulation operation which comprises: (a) a breaker chemical; (b) a water soluble sealing layer, such as urea, having a thickness within the range of about 1 to about 30 microns deposited on the surface of said breaker chemical and encapsulating said breaker chemical; and (c) a pinhole free coating of a neutralized sulfonated elastomeric polymer of about 2 to about 80 microns thick deposited onto the surface of the coated breaker chemical, wherein said neutralized sulfonated polymer encapsulates the breaker chemical and is permeable to the breaker chemical.

23 Claims, 1 Drawing Sheet

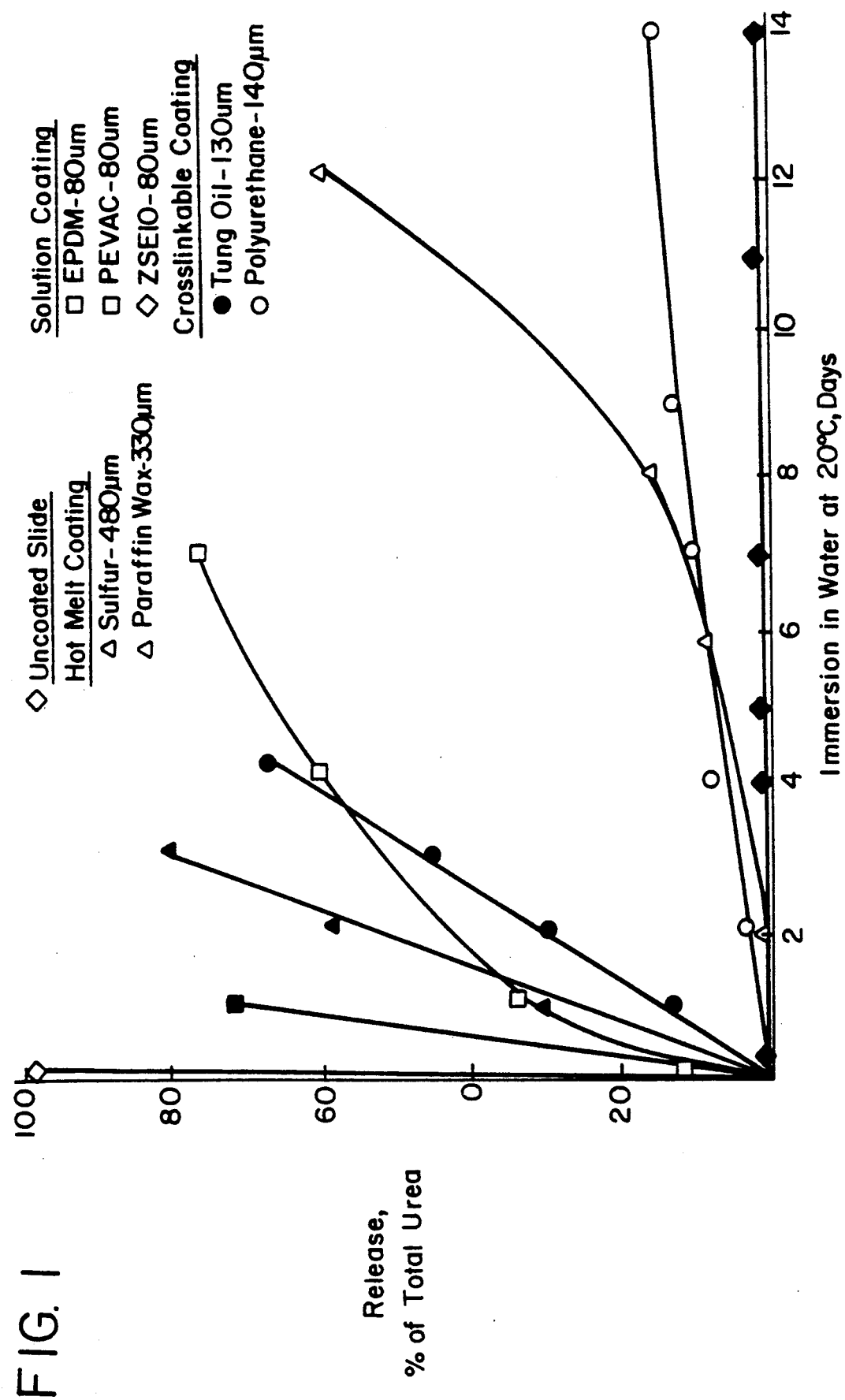

ENCAPSULATED BREAKER CHEMICAL WITH A MULTI-COAT LAYER UREA

This application is a continuation-in-part of copending applications Ser. Nos. 07/446,572 and 07/446,573, filed on Dec. 4, 1989, both now abandoned, and Ser. No. 07/446,736, filed on Dec. 6, 1989, now abandoned.

FIELD OF THE INVENTION

The present invention relates to encapsulated breaker chemicals which are used in fracturing fluid systems. The encapsulated breaker chemical comprises a breaker chemical which is encapsulated within a sealing layer which is chemically inert with respect to said breaker chemical, which structure is further encapsulated within an elastomeric polymeric coating which is suitably permeable to permit the breaker chemical to be released through the polymeric coating into the fracturing fluid. The polymeric coating of the instant invention comprises a neutralized sulfonated elastomeric polymer.

DESCRIPTION OF PRIOR ART

Solids (e.g., substrates, pipes, slabs, sheets, etc.) can be protected from the external environment with the use of barrier or protective coating materials. For protection from water or moisture, polymer or organic materials are widely used. For coat effectiveness, however, these materials are generally applied as thin films. The thickness of the film depends upon the desired degree of water protection. The thicker the film the more likely that water penetration would be slowed down. In practice, applying an effective thin coating is difficult because of the various stresses tending to make the film discontinuous (e.g., film-rupture, pin holes). Films will rupture when a threshold stress is exceeded. The lateral stress tending to rupture a film is inversely proportional to an exponential power of the film thickness. The thinner the film, the more easily it will rupture.

There are many applications for thickened or gelled solutions of polymers in aqueous or organic liquids which are quite diverse. There are also a number of physical and chemical techniques for preparing such systems. Such systems are used for viscosity control, solids carrying and fluid loss control in fracturing fluids or to place sand or gravel packs downhole in oil or gas wells.

Many types of fluids are available for rise in wellbore fracturing procedures. Chief properties required by the fracturing fluids are low leak off rate, the ability to carry a propping agent and low pumping friction loss. The fluid should also be easy to remove from the formation; it should be compatible with natural formation fluids; and it should cause a minimum of damage to the formation permeability. These properties can be achieved with oil based fluids, water based fluids, emulsions, foam, and other multi-phase suspensions.

A fracturing process used in a well treating operation involves the introduction into the well of a fluid under sufficient hydraulic pressure to produce or enlarge fractures in the subterranean formation. The fracturing fluid usually contains a propping agent such as sand, sintered alumina, glass beads, aluminum spacers, urea prills or nutshells, wherein the propping agent is deposited within the fracture in order to maintain the fracture in an open mode or alternatively, an acid is contained within the fracturing fluid wherein the acid reacts with acid reactable components of the subterranean formation thereby creating and enlarging the fracture so that one obtains increased flow of fluids from the subterranean formation. The propping agent is suspended within a polymeric gel or a highly viscous polymeric solution. After the highly viscous fluid has been pumped into the fracture and the fracture is formed or enlarged, it is desirable that the highly viscous fluid be converted into a low viscosity fluid so that the fluid can be removed from the fracture thereby leaving the propping agent within the fracture. The removal of the fluid is necessary so that the oil or gas can flow back through the fracture into the well bore. The conversion of the highly viscous solution into the lower viscosity fluid is called breaking the gel. The breaking of the gel is accomplished by adding a breaker chemical to the gel at the appropriate time. It is critical that the breaking process does not prematurely occur prior to the completion of the fracturing process. The usual method of addition of the breaker chemical is to pump it through the well bore into the fracture upon completion of the fracturing process, but this presents the problem of having the breaker chemical completely mix with the viscous fluid within the fracture to maximize breaking of the gel.

The use of breaker systems to break viscous water gels and fluids is not of itself new. Systems describing these chemicals are found, for example, in U.S. Pat. Nos. 3,167,510; 3,816,151; 3,960,736; 4,250,044 and 4,506,734. But most of these breakers are applied after introduction of the fracturing fluid into the wellbore because these breakers immediately start to degrade the viscosity enhancer in the fracturing fluid upon contact thereby lowering the efficiency of the fracturing process. In such cases, additional time and labor are needed to effect the reduction of the viscosity of fracturing fluids introduced into the subterranean formation. The use of organic breakers such as alkyl formate may alleviate this problem, since they can be applied along with the fracturing fluid. But these types of breakers rely on certain subterranean conditions, such as elevated temperature and time, to effect a viscosity reduction of the fracturing fluid. Since these organic breaker chemicals work on chemical change, such as hydrolysis, they are slow in effecting viscosity reduction. Furthermore, their performance can be unpredictable.

Accordingly, the incorporation of a breaker chemical into the fracturing fluid prior to the pumping of the fracturing fluid into the well bore and well fractures is desirable. The breaker chemical must be in a passive, non-reactive state such that it cannot react with the viscous fluid of the fracturing well prior to the injection of the fracturing fluid into the fractures, but the breaker chemical must be capable of reacting with the viscous fluid of the fracturing fluid within the fracture upon the completion of the fracturing process. The present invention teaches a method of accomplishing this objective.

SUMMARY OF THE INVENTION

The present invention relates to encapsulated breaker chemicals which are used in a process for forming and enlarging fractures in a subterranean formation in oil well stimulation operations. The encapsulated breaker chemical is added above ground to the fracturing fluid which comprises a viscous or gelled polymeric solution, a propping agent, the encapsulated breaker chemical and other additives commonly used in fracturing fluids. The encapsulated breaker chemical comprises a breaker chemical having a sealing layer deposited on and encapsulating the breaker chemical, and an elastomeric coating deposited on the surface of the sealing layer, wherein the elastomeric coating, having a thickness of at least about 1 micron, preferably from about 1 to about 100 microns, more preferably from about 2 to about 80 microns, and most preferably from about 5 to about 70 microns encapsulates the sealing layer, and the sealing layer having a preferred thickness of from about 1 to about 30 microns encapsulates the breaker chemical. The elastomer coating must be made from a material which will be permeable to the breaker chemical under conditions of use. The coating of the instant invention comprises a neutralized and ionically cross linked sulfonated elastomeric polymer, preferably a neutralized sulfonated terpolymer of ethylene, propylene and a non-conjugated diene (EPDM terpolymer).

BRIEF DESCRIPTION OF THE DRAWING

FIG. 1 illustrates a plot of release versus immersion time in water for the coatings of the instant invention and control samples.

DETAILED DESCRIPTION OF THE INVENTION

The present invention relates to an encapsulated breaker chemical composition used in a fracturing process in the production of oil or gas which comprises: (a) a breaker chemical; (b) a sealing layer or coating encapsulating the breaker chemical; and (c) a pinhole free coating of a neutralized sulfonated elastomeric polymer having a preferred thickness of about 2 to about 80 microns deposited onto the surface of the sealing layer wherein said neutralized sulfonated polymer encapsulates said sealed breaker chemical, wherein said neutralized sulfonated polymer will be permeable to said breaker chemical under conditions of use and said neutralized sulfonated polymer is substantially non-reactive to said breaker chemical.

The sulfonated (sulfo) elastomeric polymers which are preferred for the purposes of this invention are water insoluble and include sulfonated copolymers of ethylene and propylene, sulfonated terpolymers of ethylene, propylene and a diene, preferably a non-conjugated diene (EPDM), sulfo Butyl rubber, sulfo isoprene/styrene rubber, sulfo isoprene/butadiene rubber, sulfo isoprene/butadiene/styrene copolymers, sulfo isobutylene/styrene copolymers, sulfo isobutylene/para methyl styrene copolymers, and complexes of the aforementioned polymers with a nitrogen containing polymer such as vinyl pyridine copolymer.

The more preferred neutralized sulfonated elastomers of the instant invention are selected form the group consisting of sulfonated Butyl rubber, sulfonated EPDM terpolymer and a complex of sulfonated (PDM terpolymer with a vinylpyridine copolymer.

The water insoluble sulfonated polymers of the instant invention will comprise from about 4 to about 200 milliequivalents of pendant sulfonate groups per 100 grams of polymer, more preferably from 10 to 100 meq. pendant sulfonate groups. The sulfonated elastomers utilized in the instant invention are neutralized with transition elements selected from Groups IVA, VA, VIA, VIIA, VIIIA, IB, and IIB of the Periodic Table of Elements and lead, tin, and antimony, as well as ammonium and amine counterions. Zinc and sodium neutralizing ions (as ionic salts, e.g., acetate or hydroxide) are preferred.

Neutralization of the cited polymers with appropriate metal hydroxides, metal acetates, metal oxides or ammonium hydroxide, etc. can be conducted by means well known in the art. For example, the sulfonation process as with Butyl rubber, containing a small 0.3 to 1.0 mole percent unsaturation, can be conducted in a suitable solvent, such as toluene with acetyl sulfate as the sulfonating agent such as described in U.S. Pat. No. 3,836,511, incorporated herein by reference. The resulting sulfonic acid derivative can then be neutralized with a number of different neutralization agents such as sodium phenolate and similar metal salts. The amounts of such neutralization agents employed will normally be stoichiometrically related to the amount of free acid in the polymer. It is preferred that the amount of neutralizing agent employed is in an excess percent to ensure full neutralization. The use of an excess of such neutralization agent is necessary to effect at least 50 percent neutralization of the sulfonic acid groups present in the polymer, preferably at least 90 percent, and most preferably essentially complete neutralization of such acid groups should be effected.

Thus, the degree of neutralization of said sulfonate groups may vary from 50 to 100 mole percent. With the utilization of neutralized sulfonates in the instant invention, it is preferred that the degree of neutralization be substantially complete, that is, with no substantial free acid present and without substantial excess of the base, other than that needed to ensure neutralization. The neutralized sulfonates possess greater thermal stability compared to their acid form and are ionically cross-linked. Thus it is clear that the polymers which are normally utilized in the instant invention comprise substantially neutralized pendant groups and, in fact, an excess of the neutralizing material may be utilized without defeating the objects of the instant invention.

The sulfonated elastomer polymers of the instant invention may vary in number average molecular weight from 1,000 to 10,000,000 preferably 5,000 to 1,000,000 most preferably from 10,000 to 600,000. These polymers may be prepared by methods known in the art, for example, see U.S. Pat. No. 3,642,728, incorporated herein by reference.

The most preferred sulfonated polymers for use in the instant invention are sulfonated ethylene/propylene terpolymers which may be prepared by the procedures described in U.S. Pat. No. 3,870,841, incorporated herein by reference.

The sulfonated polymers of the instant invention may be neutralized prior to incorporation into organic solvent or by neutralization of the acid form in situ. Preferably the acid derivative is neutralized immediately after preparation. For example, if the sulfonation of an EPDM terpolymer is conducted in solution, then the neutralization of that acid derivative can be conducted immediately following the sulfonation procedure. The neutralized polymer may then be isolated by means well known to those skilled in the art, i.e., coagulation, steam stripping, or solvent evaporation, because the neutralized polymer has sufficient thermal stability to be dried for employment at a later time in the process of the instant invention. It is well known that some unneutralized sulfonic acid derivatives do not possess good thermal stability and the above operations avoid that problem.

The concentration of the neutralized sulfonated polymer in the solvent solution is about 0.1 to about 20 weight percent, more preferably about 0.5 to about 6.0 weight percent. As discussed above, a variety of polymer backbones will display the desirable properties discovered in this invention.

Specific examples of organic liquids to be employed as solvents for the polymers include:

| Polymer | Organic Liquid |
|---|---|
| Sulfonated ethylene-propylene terpolymer | aliphatic and aromatic solvent oils such as Solvent "100 Neutral", "150 Neutral", and similar oils; benzene; diesel oil; toluene; xylene; ethyl benzene; pentane; hexane; heptane; octane; isooctane; nonane; decane; and ketone solvents. |
| sulfonated polystyrene | benzene, toluene, ethyl benzene, methyl ethyl ketone, xylene, styrene, ethylene dichloride, and methylene chloride |

In order to reduce the viscosity of the organic hydrocarbon solution of the sulfonated polymer so as to be able to employ the organic hydrocarbon solution in a fluidized bed process, a polar cosolvent may be added to the organic hydrocarbon solution of the sulfonated elastomeric polymer to solubilize the pendant ionomeric groups. The polar cosolvent will have a solubility parameter of at least 10.0, more preferably at least 11.0, and may comprise from 0.0001 to 15.0 weight percent, preferably 0.001 to 5.0 weight percent, of the total mixture of organic liquid, water insoluble ionomeric polymer and polar cosolvent.

Normally, the polar cosolvent will be a liquid at room temperature, however, this is not a requirement. It is preferred, but not required, that the polar cosolvent be soluble or miscible with the organic liquid at the levels employed in this invention. The polar cosolvent may be selected from the group consisting of alcohols, amines, di- or tri-functional alcohols, amides, acetamides, phosphates, or lactones and mixtures thereof. Especially preferred polar cosolvents are aliphatic alcohols such as methanol, ethanol, n-propanol, isopropanol, 1,2-propane diol, monoethyl ether of ethylene glycol and n-ethylformamide.

The coating of any solid particulates such as the breaker chemical of fracturing fluid breaker systems can be achieved by spraying in a fluidized bed process a solution of sealing layer (such as a aqueous solution of urea) onto a cascading stream of granules to be coated, and drying said granules, to achieve a sealing layer thickness within the range of from about 1 to about 30 microns. The coated granules may then be subsequently overcoated with the neutralized elastomer, such as a zinc sulfo EPDM terpolymer, using a solution of the elastomer in appropriate solvent. Examples of fluidized bed coating processes are conventional spray coating wherein the solid particulates are coated by spraying the coating solution above or below the bed in a Wurster configuration or a fluidized bed with a rotating bed support plate. It is envisioned that coated solid inorganic or organic breaker systems or other particulates can be utilized in a variety of environmental conditions and yet the release of the breaker or other water soluble component of the breaker can be controlled in such a way that they are available when the reduction of viscosity is needed.

The neutralized sulfonated elastomers of this invention are slowly permeable to water and essentially impermeable to the breaker chemicals mentioned herein under well-bore conditions. Upon introduction into aqueous fracturing fluids or other aqueous wellbore fluids, the encapsulated substrate slowly absorbs water by diffusion through the polymeric coating. This water dissolves the substrate and sets up an osmotic gradient which in turn draws in more water. Pressure builds up inside the capsule, and it expands until resealable micropores (not pinholes) form in its walls. Concentrated substrate solution is then ejected through the micropores into the surrounding medium. This relives the pressure inside the capsule which then shrinks. The micropores reseal, and the process repeats itself until insufficient substrate remains for swelling and micropores to form.

Specific examples of preferred breaker chemicals of the instant invention are selected from the group consisting of ammonium and alkali persulfates, alkyl formates, salicylates, acetates, chlorites, phosphates, laurates, lactates, chloroacetates, enzymes and other solid breakers. The release of the breakers from the coated solid breaker systems can be controlled by the thickness of the sulfonated polymer coating, the degree of sulfonation of the polymer, the degree of neutralization of the sulfonated groups of the sulfonated polymers, the type of cation in the sulfonated polymer, the biodegradability of the sulfonated polymers, and the intrepidity and conformity of application of the polymers.

The thickness of the coating of the neutralized sulfonated elastomeric polymer on the coated breaker chemical is about 1 to about 100 microns, more preferably about 2 to about 80 microns, and most preferably about 5 to about 70 microns.

The chemical forming the encapsulated breaker chemical may be used per se when it is in the form of a finely divided solid or, in another embodiment of the invention, it may be sprayed as a solution or in liquid form onto small, finely divided seed particles to form a coating on these seed particles. Essentially any solid which is of the proper size and which is inert to the breaker chemical (or other active material) may be used as the seed particle, but urea is preferred. This embodiment is especially preferred where the breaker chemical is itself a liquid, or is irregular in shape or not of the proper size.

In another embodiment of this invention, the encapsulated breaker chemical, with or without a seed core, may be further overcoated by processes described above with a solution of thermoplastic polymer material which exhibits permeability properties similar to those of the neutralized elastomer coating overlying the breaker chemical. This overcoat layer is particularly useful in reducing the tackiness of the elastomer layer and thereby allows for the application of a thicker elastomer layer. For example, a sulfonated EPDM elastomer layer may become tacky during the coating process and the coated particles tend to stick together. The application of an overcoat layer of thermoplastic polymer removes the tackiness of the previously coated particles so that thicker layers of the sulfo EPDM coating may be achieved.

Preferred thermoplastic overcoat layers are based on sulfonated styrene polymers or copolymers which are also neutralized to the degree set forth above with respect to the elastomeric polymers. The thickness of the thermoplastic layer is generally less than the thickness of the elastomeric layer, and may range from about 1 to about 20 microns, more preferably from about 1 to about 10 microns, and most preferably from about 1 to about 5 microns.

Thermoplastic polymers which are most preferred as overcoat layers in accordance with this invention include neutralized sulfonated poly-styrene and neutralized sulfonated poly (p-methyl) styrene having a degree of acid neutralization and a molecular weight within the ranges specified above for the elastomeric polymer.

Coating of the neutralized sulfonated elastomer, such as an EPDM terpolymer and the thermoplastic polymer, such as a neutralized sulfonated polystyrene polymer, on breaker chemicals coated with a sealing layer protects the breaker from aging and degrading the polymer coating. These coatings also function in the fracturing fluids as a barrier to water soluble components of the fracturing fluid thereby shielding the breaker chemical from the premature release of the breaker chemical into the fracturing fluid.

The protective layer is most important when an oxidizer is the breaker since it protects the breaker chemical from degrading the polymeric coating. It is contemplated that any solid that is inert to the breaker and the neutralized sulfonated EPDM terpolymer may be used as the protective layer as long as it is water soluble and does not change the breaker release through the neutralized sulfonated EPDM terpolymer and the neutralized sulfonated polystyrene polymer. Urea is most preferred as the protective layer.

The preferred breaker chemicals which may be encapsulated include ammonium persulfate, sodium persulfate, potassium persulfate, sodium chlorite, ammonium bifluoride, ammonium fluoride, sodium fluoride, potassium fluoride, sulfamic acid, citric acid, oxalic acid, ammonium sulfate, sodium acetate and enzymes and mixtures thereof.

The breaker chemical can also be used in combination with a polymeric matrix as described in U.S. Pat. No. 4,738,897 incorporated herein by reference, absorbed on a porous solid such as diatomaceous earth or coated on an inert core substrate such as urea as described above.

Other oil well chemical additives can be encapsulated in addition to or in place of the breaker chemicals. These materials when encapsulated will be administered under the same conditions and in the same ways as in normal use. These oil well chemical additives are selected from the group consisting of: scale inhibitors such as polyacrylates, phosphonates and phosphate esters; corrosion inhibitor such as acid amine salts, imidazolines and quaternary amines; demulsifiers such as alkoxylated resins, alkoxylated polyols and alkoxylated polyesters; biocides such as glutaraldehydes, isothiazolinones and dithiocarbamates; paraffin inhibitors such as ethylene vinyl acetate copolymers, alpha olefin maleate and furmarate polyesters, and vinyl acetate; foamers such as ether sulfates, alpha olefin sulfonates and quaternary amines; cement accelerators such as calcium chloride and aluminum chloride; and gas migration agents such as latex rubbers and aluminum powders.

It is also within the scope of this invention that other inorganic and organic materials may be encapsulated with the polymeric coating system of this invention such as materials used in agricultural applications, wherein these agricultural materials are selected from the group consisting of urea fertilizers, herbicides, pesticides and mixtures thereof.

In order for the elastomeric coatings to be functional, they have to meet one or more of the following criteria: the coating material should show improved barrier properties; the applied thin coating should be a continuous film with few or no defects, i.e., be substantially free of pinholes. The term "pinholes" as used herein is understood to mean discontinuities in the polymeric coating of such size and shape as to prevent osmotic pressure buildup.

Fracture fluids commonly used in fracturing operations include water-based brine fluids containing a water-soluble polymer such as hydroxypropyl guar cross-linked with a transition metal salt as is well known in the art. Other polymers used to viscosify aqueous fracturing fluids are hydroxyethyl cellulose, polyacrylamide, gum karaya and the like. In addition, fracturing fluids may be viscous oils or oil-based emulsions. Viscosification of these is accomplished via addition of surfactants, asphalts, fatty-acid soaps, other emulsion and foam stabilizing agents and the like.

Typical propping agents used in hydraulic fracturing for retaining the integrity of the fractures are nut shells, plastic beads, glass beads, sand, sintered alumina, urea prills and aluminum spacers. The concentration used depends on the size and shape of the proppant, the type of formation being fractured, the carrying capacity of the fracturing fluids and the desired permeability of the resistant fractures. The concentrations generally range from 1 to 30 lb. per gal.

Other additives commonly used in hydraulic fracturing fluids are fluid loss or wall building agents such as starch, bentonite, silica flour, guar gum and surfactants; friction-reducing agents such as small amounts of high molecular weight linear polymers such as polyacrylamide; specific gravity increasing agents; bactericides; scale-removal/prevention agents, and surfactants or alcohol to reduce interfacial tension and the resistance to return flow.

The following Examples are illustrative of the invention.

EXAMPLE 1

This example sets forth the preparation of two sulfonated EPDM terpolymers which are subsequently neutralized to form the zinc salt (SEPDM).

Sulfonated EPDM terpolymers are prepared by sulfonating a terpolymer comprising about 50 weight percent ethylene, about 5 weight percent ethylidene norbornene (ENB) and the balance being propylene. This material is available from Uniroyal under the trademark "ROYALENE" 521. Sulfonation was carried out by treatment with acetyl sulfate and neutralization with ZN (Ac)$_2$ according to the procedure of U.S. Pat. No. 3,836,511, herein incorporated by reference.

Two species of neutralized elastomer were produced, one having 10 meq. of zinc sulfonate groups per 100 grams of the EPDM terpolymer (hereinafter designated ZSE-10), and the other having 25 meq. of zinc sulfonate groups per 100 grams of the (PDM terpolymer (hereinafter designated ZSE-25).

EXAMPLE 2

Improved Barrier Properties of a Sulfonated Polymer

A solution of a zinc neutralized sulfonated EPDM polymer was prepared for application as a coating solution. The solution cast coating was applied over urea samples in order to measure the barrier properties for urea extraction by water through the thin film coating.

Solution A was prepared by mixing 2.5 grams of a zinc sulfo-EPDM similar to the one described in Example 1 (Uniroyal Ionic Elastomer 2560), containing 25 meq. of sulfonate groups per 100 grams of ethylene propylene ethylidenenorbornene terpolymer, neutralized with zinc, in 100 grams of a solvent consisting of 97.5% toluene and 2.5% methanol reagent.

To determine the barrier properties of films formed from the solution of the sulfonated EPDM terpolymer, urea slides were coated for immersion tests. The procedures for preparing coated samples of urea slides and conduction immersion tests are described as follows:

Urea samples were prepared by depositing reagent grade urea (Fischer Scientific) over microscope glass slides. This was done by dipping glass slides into molten urea at a temperature of about 135°-145° C., followed by cooling and solidification of the urea layer. The urea layer was built up to abort 7 mm. by 4 to 5 successive dipping and cooling cycles. These urea samples were then coated by a polymeric film using a second dipping procedure. Urea slides were repeatedly dipped into polymeric solutions such as those described above, followed by drying in a vacuum oven at 70° C. for about 3 hours. The dipping and drying cycles were repeated until the film thicknesses shown in Table I were obtained.

The barrier properties of the various polymeric films were determined by immersion of each coated urea slide in about 100 g. of deionized water at room temperature. The amount of urea released into the water was determined by recovering the urea after evaporating the water. Each sample was initially immersed for 1 day, followed by immersion in fresh water for 3 days and for weekly intervals thereafter.

Table I shows the permeabilities of urea solutions extracted from the coated urea slides and immersed in water at room temperature. The permeabilities of the coating materials were determined by applying Fick's law of diffusion at steady state. Fick's law states that:

$$J_m = DA \frac{c}{X}$$

where $J_m$ = mass flux (loss) through the film or membrane, A = transport area, C concentration gradient, X = film or membrane thickness, and D = membrane diffusivity constant which is equal to the ratio of permeability (P) over the solubility ratio (K) of urea in the membrane and in water.

The performance of the zinc-sulfo-EPDM film was compared with that formed from solutions of other commercial coating materials. The first commercial coating solution was a tung oil solution made by Formby of Mississippi at 30 weight percent solids in petroleum distillate. The second commercial coating solution was linseed oil modified polyurethane Type 1 made by Minwax Paint Co. of New Jersey at 45% solids in petroleum distillate. The two commercial coatings were cured at 70° C. for 48 hours after coating.

TABLE I

PERMEABILITY OF UREA SOLUTION FROM COATED UREA SLIDES IN WATER AT ROOM TEMPERATURE

| Sample No. | Coating Material | Ratio wt/wt | Film Thickness Microns | Permeability (P = DK) cm²/sec |
|---|---|---|---|---|
| 141-3 | Tung Oil | — | 75 | $4.3 \times 10^{-9}$ |
| 141-6 | Tung Oil | — | 125 | $7.6 \times 10^{-9}$ |
| 158-4 | Polyurethane | — | 100 | $1.3 \times 10^{-9}$ |
| 158-5 | Polyurethane | — | 40 | $2.1 \times 10^{-9}$ |
| 28-14 | ZSE-25 | — | 10 | $9.6 \times 10^{-13}$ |
| 84-1 | ZSE-25 | — | 25 | $8.6 \times 10^{-13}$ |
| 84-2 | ZSE-25 | — | 30 | $8.6 \times 10^{-13}$ |

The permeability of urea solutions through the zinc sulfonated EPDM terpolymer film was found to be about 3 orders of magnitude lower than either that of tung oil or that of polyurethane. The use of tung oil and polyurethane as release control coatings on water soluble fertilizers is disclosed in U.S. Pat. Nos. 3,321,298 and 3,223,518.

The present Example shows that thin films of zinc sulfonated EPDM terpolymer complex provide a much better barrier than do commercial materials.

EXAMPLE 3

In this Example, thick coatings of reagent sulfur and paraffin wax (M.P. = 55° C.) were applied through melting (i.e., these materials were melted at about 5° C. to 10° C. above their melting point and then after quickly dipping urea samples in the melt, the hot coated sample was brought to room temperature slowly). This layering procedure was repeated three to four times to obtain a thick coating. Both unsulfonated EPDM and PEVAC (a copolymer of ethylene and vinyl acetate containing about 60 weight percent ethylene) were applied from 2.5% polymer solutions in the same solvent as the solvent for the sulfo EPDM.

FIG. 1 shows that ZSE-10 offered the best protection preventing the dissolution of urea in water at room temperature (about 22° C.). Uncoated urea dissolved quickly in water, but even thick coatings of sulfur, unsulfonated EPDM and PEVAC on similar samples did not sufficiently protect urea from dissolving in water. Paraffin wax and modified polyurethane Type 1 (made by Minwax Paint Company) protected urea from dissolving in water for at least six days. ZSE-10, however, performed the best in protecting urea from water dissolution.

EXAMPLE 4

Fluidized Bed Process for Urea Coating

The urea coated sodium persulfate granules were produced using the following procedure. 4 kg of 20-30 mesh sodium persulfate were introduced into a fluid bed coating machine, including a Wurster insert, manufactured by Glatt Air Techniques Inc., model number GPCG-5. The sodium persulfate bed was fluidized by passing 130 scfm heated air (48° C.) through the bed. After the bed reached a temperature of 30° C., a 10 weight percent solution of urea in water and methanol was sprayed into the sodium persulfate granules at the Wurster insert entrance. The spray nozzle used was a commercial two fluid nozzle using air at 3 bars pressure to form an atomized spray regime in the Wurster insert.

The spraying was continued at 20 g/min rate until the required thickness of urea was built up on the sodium persulfate, i.e. approximately 46 minutes for a coating level of 2 wt. % urea on the sodium persulfate.

After the solution was sprayed onto the granules in the Wurster insert, the thinly coated granules were blown by the heated air upwards into the drying section of the machine. Here, the solvents were evaporated by the hot stream, leaving a thin coat of urea on the granules. The dried granules fell back into the fluid bed and then reentered the Wurster insert where the coating process was repeated. Thus, multiple films and layers of the urea were built up until the spraying was stopped at a 2 wt % coating.

EXAMPLE 5

Fluidized Bed Process for SEPDM Coating

Urea coated sodium persulfate granules coated with SEPDM were produced using the following procedure:

4 kg of 20–30 mesh urea coated sodium persulfate granules were introduced into a fluid bed coating machine, including a Wurster insert, manufactured by Glatt Air Techniques Inc., model number GPCG-5. The granular bed was fluidized by blowing 130 scfm of heated air (45° C.) through the bed. After the bed reached a temperature of 30° C., a 1.25 weight percent solution of the SEPDM polymer in toluene and methanol cosolvent was sprayed onto the granules at the Wurster insert entrance. The spray nozzle used was a commercial two fluid nozzle using air at 3 bars pressure to form an atomized spray regime in the Wurster insert.

The spraying was continued at 40 gm/min rate until the required thickness of polymeric coating was built up on the granules, i.e., approximately 80 minutes per a coating level of 1 weight percent polymer on the urea coated sodium persulfate.

After the solution was sprayed onto the granules in the Wurster insert, the thus coated granules were blown by the heated air upwards into the drying section of the machine. Here, the solvents were evaporated by the hot stream, leaving a thin coat of dried polymeric material on the granulas. The dried granules fell back into the fluid bed and then reentered the Wurster insert where the coating process was repeated. Thus, multiple films or layers of the sulfonated polymeric coating was built up until the spraying was stopped.

After a 1 weight % coating was put on the granules, a 60 gram sample was taken and marked as 1 wt % of SEPDM on urea coated sodium persulfate. The spraying was continued until 2wt % SEPDM was added. The spraying was then stopped and the coated granules were dried with the hot air for 5 minutes.

EXAMPLE 6

2.34 grams of 20 to 30 mesh urea coated granulated sodium persulfate coated with 1 and 2 weight percent SEPDM terpolymer as set forth in Example 5, were placed in 30 grams of a 30 weight percent barium chloride solution. The sodium persulfate converts to approximately 5.5 grams of barium sulfate, as shown by the uncoated persulfate data at 250° F./121° C. The coated solids, after remaining at the desired release temperature and time, were separated from the finer barium sulfate solids and the water by pouring through a 40 mesh sieve. The sieve was thoroughly rinsed with water to remove any solids or liquids clinging to coated solids. The barium sulfate in water plus any water soluble salts were left overnight to separate. The free water was then decanted from the solid barium sulfate. The remaining water was removed by drying in an oven at 150° F. (65° C.) overnight. The remaining barium sulfate was weighed and recorded in Table II. The percent sodium persulfate released is given by using the uncoated weight at 100% released.

TABLE II

| | | Release of Coated Sodium Persulfate in Water at Time and Temperature | | | | | |
|---|---|---|---|---|---|---|---|
| | | Release of Coated Sodium Persulfate by Weight in grams of Converted Barium Sulfate and by Percent versus Time in hours | | | | | |
| Coated Sodium | Temperature | 4 | | 8 | | 16 | |
| Persulfate | (°F./°C.) | weight (g) | % | weight (g) | % | weight (g) | % |
| Sodium Persulfate | 75/24 | 0.83 | 100 | 0.88 | 100 | 0.86 | 100 |
| with 2 wt % urea | 150/65 | 4.79 | 100 | 4.22 | 100 | 4.95 | 100 |
| | 250/121 | 5.30 | 100 | 5.34 | 100 | 5.20 | 100 |
| Sodium Persulfate | 75/24 | 0.28 | 34 | 0.61 | 69 | 0.78 | 91 |
| with 2 wt % urea | 150/65 | 1.36 | 28 | 2.91 | 69 | 4.42 | 89 |
| Plus 1 weight | 250/121 | 4.40 | 83 | 4.38 | 82 | 4.27 | 82 |
| Percent S-EPDM | | | | | | | |
| Coating | | | | | | | |
| Sodium Persulfate | 75/24 | 0.25 | 30 | 0.48 | 55 | 0.59 | 69 |
| with 2 wt % urea | 150/65 | 1.01 | 21 | 2.64 | 63 | 4.26 | 86 |
| Plus 2 weight | 250/121 | 4.35 | 82 | 4.23 | 79 | 4.28 | 82 |
| Percent S-EPDM | | | | | | | |
| Coating | | | | | | | |
| Sodium Persulfate | 75/24 | 0.25 | 30 | 0.42 | 48 | 0.64 | 74 |
| with 2 wt % urea | 150/65 | 1.13 | 24 | 2.30 | 55 | 6.20 | 85 |
| plus 2 wt % SEPDM | 250/121 | 4.40 | 83 | 4.35 | 81 | 6.45 | 86 |
| plus ½ wt % SPS | | | | | | | |

EXAMPLE 7

The following Example illustrates the preparation of a sodium sulfonated polystyrene thermoplastic polymer (SPS) which may be used as an additional layer over the SEPDM layer.

Sulfonated polystyrene is manufactured as a 30% suspension/emulsion in water. The monomers of sodium styrene sulfonate (NaSS) and styrene are added to water (oxygen free) containing surfactant (sodium lauryl sulfate), catalysts (potassium persulfate and sodium bisulfate) and chelates (EDTA) for iron. The mixture is reacted at 180° F. (82° C.) for 3 hours. After the reaction is complete, an antioxidant (BHT) is added. The final product is 30% SPS suspended/emulsified into water. The polymer is oil soluble since only 3.8% NaSS is present in the polymer.

EXAMPLE 8

The multilayer coating with sulfonated polystyrene polymer is achieved by spraying the sodium sulfonated polystyrene (SPS), as prepared in Example 7 or a dilution thereof, onto the cascading stream of granules coated as described above with the sulfonated EPDM terpolymer. The SPS polymer is a suspension/emulsion in water so it can easily be diluted with water to the proper level for spraying multilayer coats.

After 2 wt. % of SEPDM was put on the sodium persulfate as set forth in Example 6, a ½ wt. % of SPS was added as a top layer. The conditions were kept the same as in Example 5 above except that a 5 wt. % SPS solution, a dilution of 30 wt. % SPS solution in water, was sprayed onto the 2 wt. % SEPDM coated granules at a rate of 40 gm/min. After approximately 9 minutes, a ½% SPS coating was completed. The spraying was stopped and the product was dried with hot air another 5 minutes. The product comprised 2 wt. % SEPDM plus ½ wt. % SPS on sodium persulfate.

The release properties of this material were also evaluated as in Example 5 above and are reported as the last entry in Table II.

EXAMPLE 9

Sodium persulfate was layered/coated on urea seed granules by using the following procedure: 1.6 kg of 2.5 mm OD urea granules were introduced into a fluid bed coating machine with a 2 liter bowl, manufactured by Glatt Air Techniques Inc., model number GPCG-1. The urea bed was fluidized by blowing approximately 130 scfm of heated air (45° C.) through the bed. After the bed reached 30° C., a 10 wt % sodium persulfate solution in water and methanol was sprayed onto the urea fluidized to the top of the bowl with a top spray nozzle. The spray nozzle used was a commercial two-fluid nozzle using air at 2 bars pressure to form an atomized spray regime in the bowl.

The spraying was done at 20 gm/min and continued until approximately a 5 wt % coating of sodium persulfate was added. The spraying took approximately 40 minutes to add the 5 wt % level. The product was urea particles coated with 5 wt % sodium persulfate.

These coated seed particles may be further coated with urea and with the elastomer and elastomer/thermoplastic combination as set forth above.

EXAMPLE 10

A viscous (gelled) 2 weight percent potassium chloride solution was used to test the effects of coated breaker chemical (oxidizer) on reducing the viscosity or breaking the gel of the viscous brine solution.

The coated breaker was compared with the base gel without breaker and with the uncoated oxidizer added to the base gel.

The viscous brine was made by adding 50 pounds per 1000 gallons of hydroxypropyl guar (HPG) to a 2 wt % KCl solution.

The viscosities were measured with a Fann 35 VG viscometer at 311 sec$^{-1}$ (300 rpm) shear. Viscosities were taken during heatup to 175° F. (79.4° C.) and versus time at 175° F. Two hundred milliliters of gelled brine was used for the tests. The coated breaker sodium persulfate at 8 and 4 pounds per 1000 gallons (PPT) of gelled brine were added to the Fann 35 VG meter measuring cup. Also 0.5 PPT of uncoated sodium persulfate were added in one test to show the effect of the SEPDM/SPS coatings on the release of sodium persulfate with time at 175° F. The base gelled brine with no additives were measured for comparisons.

Table III shows the advantage of coating the sodium persulfate to delay the release of the oxidizer at a temperature of 175° F.

The uncoated sodium persulfate broke the gel to 5 cp in 30 minutes whereas the coated sodium persulfate at 4 and 8 PPT were only 14 and 8 cp after 160 minutes. Comparison with the untreated base gel shows the oxidizers all break the gel.

The film forming properties of sulfonated polymers permits them to be used in coating applications, including controlled release products in oil and gas well operations (e.g., controlled release fracturing fluid breaker system or "breakers").

Coatings of neutralized sulfonated polymers on coated breaker chemicals which are used in fracturing fluids will act as barriers to water soluble components of the fracturing fluid thereby shielding the breaker chemical from the premature release of the breaker chemical into the fracturing fluid.

Because of their unique barrier properties sulfonated polymers can be used to make cost effective controlled release breaker chemicals. The benefits obtained by the use of these coatings can include labor savings, increased breaker utilization efficiency, time savings and reduction in residual damage to the well caused by residual gels.

TABLE III

EFFECT OF COATED OXIDIZER (SODIUM PERSULFATE) ON VISCOSITY OF HYDROXYPROPYL GUAR (HPG) GELLED 2% POTASSIUM CHLORIDE (KCL) SOLUTION

1. Viscous brine made by adding 50 pounds per 1000 gallons (PPT) of HPG to 2% KCl solution (0.6 g HPG per 100 ml solution).
2. Viscosities measured with Fann 35 VG viscometer at 311 sec$^{-1}$ (300 rpm).
3. Viscosities taken during heatup to 175° F. and versus time at 175° F.
4. Two hundred milliliters of gel treated with oxidizer for tests.

| | | Viscosity (cp) of Gelled Solution with Oxidizers - Normalized* | | | |
| --- | --- | --- | --- | --- | --- |
| Temperature (°F.) | Time (min) | No Oxidizer | Coated Oxidizer #2 (8 ppt) | Coated Oxidizer #2 (4 ppt) | Uncoated Na$_2$S$_2$O$_3$ (½ ppt) |
| 80 | | 50.0 | 50.0 | 50.0 | 50.0 |
| 100 | | 47.2 | 46.3 | 47.5 | 47.0 |
| 120 | | 43.4 | 42.6 | 44.1 | 43.1 |
| 140 | | 39.2 | — | 38.2 | 37.6 |
| 160 | | 33.5 | — | 33.3 | 31.7 |
| 175 | 0 | 30.2 | 28.9 | 29.2 | 28.2 |

TABLE III-continued
EFFECT OF COATED OXIDIZER (SODIUM PERSULFATE)
ON VISCOSITY OF HYDROXYPROPYL
GUAR (HPG) GELLED 2% POTASSIUM CHLORIDE (KCL) SOLUTION

| | | | | |
|---|---|---|---|---|
| 5 | 29.2 | 28.4 | 29.9 | 18.3 |
| 10 | 29.2 | 28.4 | 29.9 | 13.4 |
| 20 | 30.2 | 26.8 | 28.9 | 7.9 |
| 30 | 30.2 | 24.2 | 27.9 | 5.4 |
| 40 | 30.2 | 22.1 | 25.5 | |
| 60 | 30.2 | 18.4 | 22.5 | |
| 80 | 30.2 | 15.8 | 19.6 | |
| 100 | 30.2 | 14.7 | 17.6 | |
| 160 | 30.2 | 7.9 | 13.7 | |

Coated Oxidizer #1 (LAM 2J) Urea = 83.4%, Persulfate = 9.0%, S-EPDM = 3.1% & SPS = 2.5%
Coated Oxidizer #3 (LAM 1G) Persulfate = 82.0%, Urea = 4.3%, S-EPDM = 2.0%, SPS = 2.0%
*Normalized to 50 cp at 80° F.

What is claimed is:

1. An encapsulated breaker chemical composition used in an oil or gas stimulation operation which comprises:

(a) a particulate breaker chemical;

(b) a water soluble sealing layer having a thickness of at least about 1 micron deposited onto the surface of particles of said breaker chemical and encapsulating said breaker chemical; and (c) a coating substantially free of pinholes comprising a neutralized sulfonated elastomeric polymer having a thickness of at least about 1 micron deposited onto the sealing layer surface of particles of said breaker chemical, wherein said neutralized sulfonated polymer encapsulates and is essentially impermeable under conditions of use to said breaker chemical.

2. The composition of claim 1 wherein said sealing layer comprises urea.

3. The composition of claim 2 wherein said urea layer has a thickness in the range of from about 1 to about 30 microns.

4. The encapsulated breaker chemical composition of claim 1 wherein said elastomeric polymer is selected from the group consisting of sulfonated copolymers of ethylene and propylene, sulfonated terpolymers of ethylene, propylene and a diene, sulfo Butyl rubber, sulfo isoprene/styrene rubber, sulfo isoprene/butadiene rubber, sulfo isoprene/butadiene/styrene copolymers, sulfo isobutylene/styrene copolymers, sulfo isobutylene/para methyl styrene copolymers, and complexes of the aforementioned polymers with a vinyl pyridine copolymer.

5. The encapsulated breaker chemical composition of claim 1 wherein said elastomer coating has a thickness within the range of from about 2 to about 50 microns.

6. The encapsulated breaker chemical composition of claim 4 wherein said neutralized elastomeric polymer is a neutralized sulfonated EPDM terpolymer.

7. The encapsulated breaker chemical composition of claim 1 wherein the acid groups of said elastomeric polymer are at least about 50% neutralized.

8. The encapsulated breaker chemical composition of claim 7 wherein the acid groups of said elastomeric polymer are about 100% neutralized.

9. The encapsulated breaker chemical composition of claim 7 wherein the acid groups of said sulfonated elastomeric polymer are neutralized with an ion selected from the group consisting of zinc and sodium ions.

10. The encapsulated breaker chemical composition of claim 1 wherein said breaker chemical is coated on a seed particle which is essentially chemically inert with respect to said breaker chemical.

11. The encapsulated breaker chemical composition of claim 10 wherein said seed particle comprises urea.

12. The encapsulated breaker chemical composition of claim 1 wherein said breaker chemical is selected from the group consisting of ammonium persulfate, potassium persulfate, sodium persulfate, sodium chlorite and mixtures thereof.

13. The encapsulated breaker chemical composition of claim 1 wherein said breaker chemical is selected from the group consisting of sulfamic acid, oxalic acid, citric acid, ammonium sulfate, sodium acetate and mixtures thereof.

14. The encapsulated breaker chemical composition of claim 1 wherein said breaker chemical is selected from the group consisting of ammonium bifluoride, potassium fluoride, sodium fluoride and mixtures thereof.

15. The encapsulated breaker chemical composition of claim 1 wherein said breaker chemical is an enzyme.

16. The encapsulated breaker chemical composition of claim 6 wherein said EPDM terpolymer contains copolymerized ethylidene norbornene.

17. The encapsulated breaker chemical composition of claim 6 wherein said coating has a thickness in the range of from about 2 to about 80 microns.

18. The encapsulated breaker chemical composition of claim 1 wherein said sulfonated elastomeric polymer contains from about 4 to about 200 milliequivalents of pendant sulfonate groups per 100 g of polymer.

19. The composition of claim 1 wherein said encapsulated breaker chemical is further overcoated with a layer of thermoplastic polymer.

20. The composition of claim 19 wherein said thermoplastic polymer is a neutralized sulfonated styrene polymer.

21. The composition of claim 20 wherein the thickness of said layer of thermoplastic polymer is within the range of from about 1 to about 20 microns.

22. A fracturing fluid comprising a carrier fluid, a viscosifying polymer or oil and an encapsulated breaker chemical as defined in claims 1, 4, 10, or 19.

23. A process for fracturing subterranean formations comprising injecting under pressure a fracturing fluid into the subterranean formation, said fracturing fluid comprising a carrier fluid, a viscosifying polymer or oil and an encapsulated breaker chemical as defined in claims 1, 4, 10, or 19.

* * * * *